(12) United States Patent
Kim et al.

(10) Patent No.: US 11,731,908 B2
(45) Date of Patent: Aug. 22, 2023

(54) GRAPHITE SHEET POLYIMIDE FILM COMPRISING SPHERICAL PI-BASED FILLER, MANUFACTURING METHOD THEREFOR, AND GRAPHITE SHEET MANUFACTURED USING SAME

(71) Applicant: PI ADVANCED MATERIALS CO., LTD., Chungcheongbuk-do (KR)

(72) Inventors: Kyung Su Kim, Seoul (KR); Jeong Yeul Choi, Anyang-Si (KR); Dong Young Won, Seoul (KR)

(73) Assignee: PI ADVANCED MATERIALS CO., LTD., Chungcheongbuk-do (KR)

(*) Notice: Subject to any disclaimer, the term of this patent is extended or adjusted under 35 U.S.C. 154(b) by 420 days.

(21) Appl. No.: 16/975,757

(22) PCT Filed: Jul. 20, 2018

(86) PCT No.: PCT/KR2018/008199
§ 371 (c)(1),
(2) Date: Aug. 26, 2020

(87) PCT Pub. No.: WO2019/164068
PCT Pub. Date: Aug. 29, 2019

(65) Prior Publication Data
US 2020/0399183 A1    Dec. 24, 2020

(30) Foreign Application Priority Data
Feb. 26, 2018  (KR) .................. 10-2018-0023078

(51) Int. Cl.
B32B 9/00 (2006.01)
C04B 35/524 (2006.01)
(Continued)

(52) U.S. Cl.
CPC ........ *C04B 35/524* (2013.01); *C04B 35/6267* (2013.01); *C08J 5/18* (2013.01);
(Continued)

(58) Field of Classification Search
CPC ..... Y10T 428/30; B82Y 30/00; C01B 32/159; C04B 35/52; C04B 35/524
(Continued)

(56) References Cited

U.S. PATENT DOCUMENTS 4,681,928 A * 7/1987 Berger ................. C08G 73/16
528/172
2006/0035085 A1* 2/2006 Ozaki ............... C04B 35/63468
428/408

(Continued)

FOREIGN PATENT DOCUMENTS

| CN | 001816504 A | 8/2006 |
| CN | 106479176 A | 3/2017 |

(Continued)

OTHER PUBLICATIONS

International Search Report and Written Opinion of the International Searching Authority, issued in PCT/2018/008199, dated Dec. 10, 2018; ISA/KR.

*Primary Examiner* — Daniel H Miller
(74) *Attorney, Agent, or Firm* — Harness, Dickey & Pierce, P.L.C.

(57) ABSTRACT

The present invention provides: a graphite sheet polyimide film, which is derived from a first precursor composition comprising a first polyamic acid and comprises a sublimable inorganic filler and a spherical polyimide-based filler; a manufacturing method therefor; and a graphite sheet manufactured using the same.

7 Claims, 1 Drawing Sheet

(51) Int. Cl.
- *C04B 35/626* (2006.01)
- *C08J 5/18* (2006.01)
- *C08L 79/08* (2006.01)
- *C08K 3/26* (2006.01)
- *C08K 3/30* (2006.01)
- *C08K 3/32* (2006.01)
- *B82Y 30/00* (2011.01)

(52) U.S. Cl.
CPC .............. *C08L 79/08* (2013.01); *B82Y 30/00* (2013.01); *C08K 2003/265* (2013.01); *C08K 2003/3045* (2013.01); *C08K 2003/325* (2013.01); *Y10T 428/30* (2015.01)

(58) Field of Classification Search
USPC ........................................................ 428/408
See application file for complete search history.

(56) References Cited

U.S. PATENT DOCUMENTS

2011/0265980 A1    11/2011  Kubo et al.
2013/0240777 A1*  9/2013  Yasuda .................. C08G 73/22
                                                        252/75

FOREIGN PATENT DOCUMENTS

| KR | 10-2001-0011184 A | 2/2001 |
|---|---|---|
| KR | 101527164 B1 | 6/2015 |
| KR | 20160116366 A | 10/2016 |
| KR | 10-2017-0024532 A | 3/2017 |
| KR | 20170049912 A | 5/2017 |
| WO | WO-2005019132 A1 | 3/2005 |

* cited by examiner

[FIG. 1]
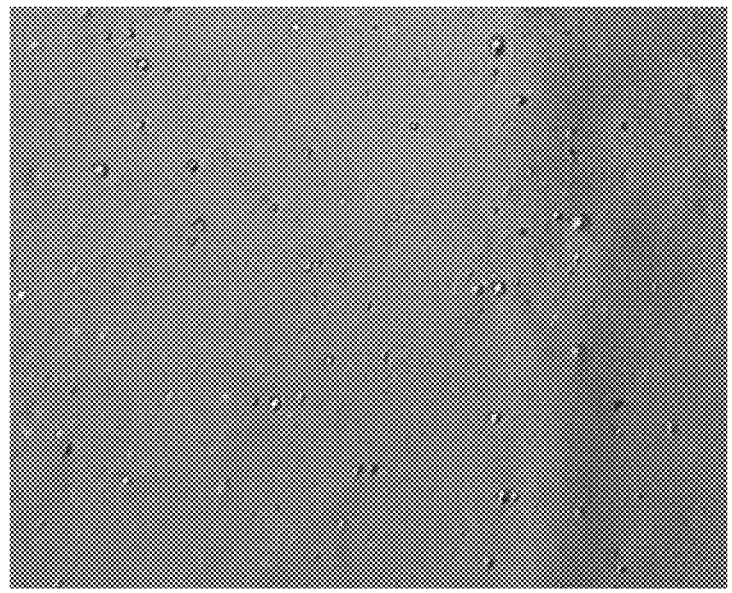
[FIG. 2]
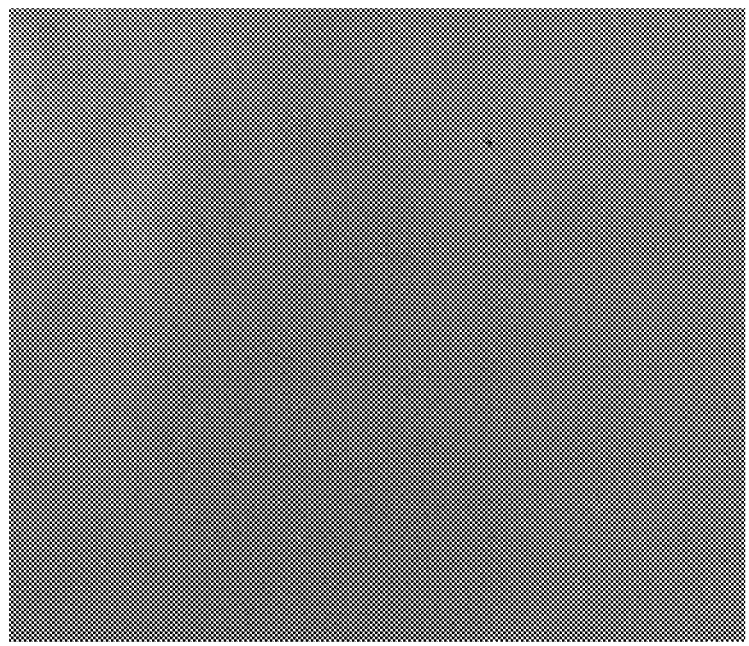

GRAPHITE SHEET POLYIMIDE FILM COMPRISING SPHERICAL PI-BASED FILLER, MANUFACTURING METHOD THEREFOR, AND GRAPHITE SHEET MANUFACTURED USING SAME

CROSS-REFERENCE TO RELATED APPLICATIONS

This application is a 371 U.S. National Phase of International Application No. PCT/KR2018/008199, filed Jul. 20, 2018, which claims priority to Korean Patent Application No. 10-2018-0023078, filed Feb. 26, 2018. The entire disclosures of the above applications are incorporated herein by reference.

TECHNICAL FIELD

The present invention relates to a spherical polyimide (PI)-based filler-containing polyimide film for graphite sheets, a method of manufacturing the same, and a graphite sheet manufactured using the same.

BACKGROUND ART

Recently, with reduction in weight and size and improvement in compactness and integration degree, electronic devices suffer from various problems due to heat load through increase in heat generation amount per unit volume. Such problems can have direct adverse effects on performance of the electronic devices, such as decrease in operation speed of a semiconductor due to heat load, reduction in lifespan due to deterioration of a battery, or the like.

For such reasons, effective heat dissipation of the electronic devices has emerged as a very important task.

As a heat dissipation means for electronic devices, graphite having good thermal conductivity has been spotlighted. In particular, artificial graphite sheets allowing easy processing and having about two to seven times higher thermal conductivity than copper or aluminum have attracted attention in the art.

The artificial graphite sheets can be manufactured through carbonization and graphitization of a polymer. Among various polymers, a heat resistant polymer capable of sustaining a temperature of about 400° C. or more may be used as a graphite precursor. An example of the heat resistant polymer may include polyimide (PI).

Polyimide is a polymer material mainly consisting of a strong aromatic backbone and an imide ring having good chemical stability. Polyimide has the highest levels of heat resistance, chemical resistance, electrical insulation, and weather resistance among various organic materials, and is known to be an optimal graphite precursor by securing good yield, high degree of crystallization, and high thermal conductivity in manufacture of artificial graphite sheets.

In general, it is known in the art that the properties of the artificial graphite sheet are significantly affected by the properties of polyimide used as the graphite precursor thereof, and modification of polyimide has been actively carried out for improvement of the properties of the artificial graphite sheet. In particular, various attempts have been made to improve thermal conductivity of the artificial graphite sheet.

For example, a high alignment polyimide film is applied to manufacture of a graphite sheet. The high alignment polyimide film is manufactured by drying a polyamic acid used as a precursor, followed by aligning polymer chains in a plane direction of a final film through drawing or compression.

The regularly aligned polymer chains form a graphite layer having good crystallinity through regular arrangement of carbon atoms in carbonization and graphitization processes. In this way, a graphite sheet of a "multilayer graphite structure" having good crystallinity can be manufactured using such a high alignment polyimide film.

However, although such a graphite sheet exhibits very good thermal conductivity in a two-dimensional direction thereof, thermal conductivity of the graphite sheet in a thickness direction thereof is 1% or less of the thermal conductivity thereof in the two-dimensional direction. It is estimated that this phenomenon is caused by a physical gap between graphite layers placed to overlap each other by electrical attractive force.

Therefore, there is a need for a graphite sheet exhibiting good thermal conductivity not only in the plane direction but also in the thickness direction and a polyimide resin allowing implementation of such a graphite sheet.

DISCLOSURE

Technical Problem

It is an object of the present invention to provide a novel polyimide film and a graphite sheet manufactured using the same.

In accordance with one aspect of the present invention, a polyimide film including sublimable inorganic fillers and spherical polyimide fillers can realize a graphite sheet having significantly improved thermal conductivity not only in a plane direction thereof but also in a thickness direction thereof.

In accordance with another aspect of the present invention, a polyimide film having improved packing efficiency of polymer chains can be realized using two types of catalysts having different properties upon imidization of a first precursor composition.

Further, it is possible to manufacture a graphite sheet having good crystallinity and thermal conductivity using the polyimide film.

The present invention is aimed at providing particular embodiments thereof.

Technical Solution

A PI-based filler-containing polyimide film according to the present invention can provide a graphite sheet having a thermal conductivity of 1,000 W/m·K or more in a plane direction thereof and a thermal conductivity of 30 W/m·K or more in a thickness direction thereof, and details of the present invention will be described in the following description.

In accordance with a first aspect of the present invention, there is provided a polyimide film for graphite sheets derived from a first precursor composition including a first polyamic acid, the polyimide film including sublimable inorganic fillers and spherical polyimide fillers.

In accordance with a second aspect of the present invention, there is provided a method of manufacturing a polyimide film using a first precursor composition obtained by preparing a first polyamic acid solution through polymerization of a diamine monomer and a dianhydride monomer in an organic solvent, followed by mixing inorganic fillers and polyimide fillers with the first polyamic acid solution.

The method may further include adding a first catalyst having a linear structure and a second catalyst having a ring structure to the first polyamic acid solution.

In accordance with a third aspect of the present invention, there are provided a graphite sheet manufactured using the polyimide film and an electronic device including the same.

Hereinafter, embodiments of the preset invention will be described in detail in the order of a "polyimide film", a "method of manufacturing a polyimide film" and a "graphite sheet".

It should be understood that terms or words used in this specification and claims have to be interpreted as have meanings and concepts consistent with the technical idea of the present invention rather than typical or dictionary interpretation on a principle that an inventor is allowed to properly define the concept of the terms in order to explain their own invention in the best way.

Therefore, since embodiments disclosed in this specification are merely preferred examples of the present invention and do not fully describe the technical idea of the present invention, it will be appreciated that there can be various equivalents and alterations thereto at a filing date of the present application.

As used herein, the singular forms "a," "an," and "the" are intended to include the plural forms as well, unless the context clearly indicates otherwise. It will be further understood that the terms "comprises," "comprising," "includes," and/or "including," as used in this specification, specify the presence of stated features, integers, steps, operations, elements, components, and/or groups thereof, but do not preclude the presence or addition of one or more other features, integers, steps, operations, elements, components, and/or groups thereof.

As used herein, "dianhydride" is intended to include a precursor, analog or derivative thereof, which may not technically be a dianhydride, but will nevertheless react with diamine to form a polyamic acid, which in turn is converted into polyimide.

As used herein, "diamine" is intended to include a precursor, analog or derivative thereof, which may not technically be a diamine, but will nevertheless react with dianhydride to form polyamic acid, which in turn is converted into polyimide.

It will be understood that disclosure of a range of values, a preferred range of values, or preferred upper and lower limits for a given parameter, such as amount and concentration, subsumes all possible sub-ranges for the parameter which may be obtained by combining any sets of values within upper and low limits or preferred values as disclosed. Unless indicated otherwise, it is intended that a numerical range recited herein encompass end points thereof, as well as all integers and fractions between the end points. Further, it is intended that the scope of the present invention not be limited to specific values used in defining a range for a certain parameter.

First Aspect: Polyimide Film

A polyimide film according to the present invention is a polyimide film for graphite sheets derived from a first precursor composition including a first polyamic acid, and includes sublimable inorganic fillers and spherical polyimide fillers.

The inorganic fillers can induce foaming phenomenon within the polyimide film through sublimation upon carbonization and/or graphitization of the polyimide film. Such foaming phenomenon allows formation of a graphite sheet having good quality through efficient discharge of sublimation gas upon carbonization and/or graphitization of the polyimide film, and voids generated by foaming can improve bending resistance (flexibility) of the graphite sheet.

However, since excessive foaming phenomenon and a number of voids generated thereby can degrade the graphite sheet through generation of surface defects or significant deterioration in thermal conductivity and mechanical properties of the graphite sheet, the kind, content and size of the inorganic fillers must be carefully selected.

According to one embodiment, the inorganic fillers may be present in an amount of 0.2 parts by weight to 0.5 parts by weight relative to 100 parts by weight of the first polyamic acid.

If the content of the inorganic fillers is less than this range, it is difficult to induce the aforementioned foaming phenomenon. In this case, efficient discharge of sublimation gas from the polyimide film cannot be achieved upon carbonization and/or graphitization of the polyimide film. The sublimation gas in the polyimide film obstructs rearrangement of carbon atoms to provide an adverse effect on conversion into artificial graphite having good purity, thereby causing deterioration in crystallinity of the graphite sheet.

Further, assuming that carbonization and/or graphitization occur substantially at the same time on a surface layer of the polyimide film and inside the polyimide film, the sublimation gas generated in the polyimide film can damage or fracture of a graphite structure formed on the surface layer of the polyimide film, thereby making it difficult to obtain a graphite sheet having good quality.

On the other hand, if the content of the inorganic fillers is less than the above range, surface roughness of the polyimide film can be deteriorated.

Here, if surface roughness of the polyimide film is excessively decreased, friction between surfaces of overlapping portions of the polyimide film increases, thereby deteriorating process handling properties. Specifically, increased adhesion between the overlapping portions of the polyimide film makes it difficult to correct a winding error due to meandering in the course of winding the polyimide film, thereby causing deterioration in winding properties and generation of a blocking phenomenon due to increase in adhesive strength upon corona treatment.

Moreover, when fine foreign matter enters a gap between the overlapping portions upon winding the polyimide film, low surface roughness of the polyimide film makes it difficult to secure a space capable of compensating for the size of the foreign matter. As a result, as a roll thickness increases by repeating winding of the polyimide film, deviation in thickness of a portion of the polyimide film corresponding to the foreign mater increases and a protrusion mark is formed on the polyimide film due to deformation caused by the foreign matter.

If the content of the inorganic fillers exceeds the above range, dispersion of the inorganic fillers can be deteriorated, whereby some agglomerated inorganic fillers can be exposed on the surface of the polyimide film, thereby causing surface defects.

On the other hand, an excess of the inorganic fillers can damage the internal structure of the graphite sheet through excessive foaming phenomenon of the polyimide film upon carbonization and graphitization, thereby causing deterioration in thermal conductivity of the graphite sheet and significant increase in the number of bright spots, which are foaming marks, on the surface of the graphite sheet.

An average particle diameter of the inorganic fillers may also be determined under the same principle as the principle used in determining the content of the inorganic fillers described above. Specifically, the inorganic fillers may have an average particle diameter of 1.5 μm to 4.5 μm.

If the average particle diameter of the inorganic fillers is less than the above range, surface roughness of the polyimide film can be deteriorated. In addition, use of the inorganic fillers having an excessively small particle diameter can make it difficult to induce a desired level of foaming upon carbonization and graphitization, thereby causing the problems described above.

If the average particle diameter of the inorganic fillers exceeds the above range, an excess of bright spots can be disadvantageously formed together with surface defects.

The inorganic fillers may include at least one type of inorganic particles selected from the group consisting of, for example, dicalcium phosphate, barium sulfate and calcium carbonate, without being limited thereto.

The polyimide fillers play an important role in determination of thermal conductivity of the graphite sheet, specifically thermal conductivity of the graphite sheet in the thickness direction thereof, upon carbonization and/or graphitization. Thus, the content and particle size of the polyimide fillers must be carefully determined.

According to one embodiment, the polyimide fillers may be present in an amount of 0.1 parts by weight to 5 parts by weight relative to 100 parts by weight of the first polyamic acid and may have an average particle diameter of 1 μm to 10 μm.

If the content of the polyimide fillers is less than the above content range, it is difficult to achieve improvement in thermal conductivity of the graphite sheet in the thickness direction thereof. This result is the same as in the case where the average particle diameter of the polyimide fillers is less than the above size range.

Such problems will become apparent from the description of the following Examples.

If the content of the polyimide fillers exceeds the above content range, dispersion of the polyimide fillers can be deteriorated, whereby some agglomerated inorganic fillers can be exposed on the surface of the polyimide film, thereby causing surface defects.

Moreover, an excess of the polyimide fillers can damage the structure of the graphite sheet by obstructing rearrangement of carbon atoms upon carbonization and/or graphitization, thereby causing significant deterioration in thermal conductivity of the graphite sheet in the plane direction thereof.

This result is the same as in the case where the average particle diameter of the polyimide fillers exceeds the above size range.

The polyimide fillers may include second polyimide chains derived from a second polyamic acid, in which a composition of monomers constituting the second polyamic acid may be the same as or different from a composition of monomers constituting the first polyamic acid.

In one embodiment, the polyimide film includes first polyimide chains derived from the first polyamic acid, in which at least some of the first polyimide chains are aligned in a plane direction to form a multilayer structure and at least some of the polyimide fillers are dispersed between layers of the multilayer structure.

Upon carbonization and/or graphitization of the polyimide film, at least part of the multilayer structure of the first polyimide chains may be graphitized to form a multilayer graphite structure and at least part of the polyimide fillers may be graphitized to form a linking portion which connects the layers of the multilayer graphite structure to each other.

The first linking portion may be a two-dimensional graphene sheet, a two-dimensional carbon allotrope having a similar shape to the graphene sheet, or a three-dimensional carbon allotrope formed by stacking the two-dimensional carbon allotropes, and may act as a heat transfer path between the layers.

Since heat is transferred along layer surfaces of the multilayer graphite structure in a typical graphite sheet, the graphite sheet has higher thermal conductivity in the plane direction of the multilayer graphite structure and lower thermal conductivity in the thickness direction thereof due to a physical gap between the layers of the multilayer structure.

Conversely, the graphite sheet derived from the polyimide film according to the present invention allows easy transfer of some heat between the layers of the multilayer graphite structure along the first linking portion, thereby achieving much better improvement in thermal conductivity in the thickness direction thereof than the typical graphite sheet.

Second Aspect: Method of Manufacturing Polyimide Film

The polyimide film according to the present invention may be manufactured from a first precursor composition of the polyimide film. Here, the first precursor composition may be commonly referred to as a polyamic acid solution.

The polyamic acid solution may be prepared by dissolving an aromatic diamine monomer and an aromatic dianhydride monomer in an organic solvent to be present in the same mole amounts, followed by polymerization:

In preparation of the first polyamic acid, the polymerization process may include, for example, (1) a process in which the total amount of the diamine monomer is dissolved in the solvent and the dianhydride monomer is added to the resulting solution until the diamine monomer and the dianhydride monomer are present substantially in the same mole amounts, followed by polymerization;

(2) a process in which the total amount of the dianhydride monomer is dissolved in the solvent and the diamine monomer is added to the resulting solution until the diamine monomer and the dianhydride monomer are present substantially in the same mole amounts, followed by polymerization;

(3) a process in which some of the diamine monomer are dissolved in the solvent and some of the dianhydride monomer are mixed in an amount of 95 mol % to 105 mol % with respect to the reacted diamine monomer, followed by adding the remaining diamine monomer and the remaining dianhydride monomer until the diamine monomer and the dianhydride monomer are present substantially in the same mole amounts, followed by polymerization;

(4) a process in which some of the dianhydride monomer are dissolved in a solvent and some of the diamine monomer are mixed in an amount of 95 mol % to 105 mol % with respect to the reacted dianhydride monomer, followed by adding the remaining dianhydride monomer and the remaining diamine monomer until the diamine monomer and the dianhydride monomer are present substantially in the same mole amounts, followed by polymerization; or (5) a process in which a first composition is prepared by mixing some of the diamine monomer with some of the dianhydride monomer in one solvent such that one of the diamine monomer and the dianhydride monomer is present in an excess in the first composition, a second composition is prepared by mixing some of the diamine monomer with some of the dianhydride monomer in another solvent such that one of the diamine monomer and the dianhydride monomer is present in an excess in the second composition, and the first composition is mixed with the second composition such that, when the diamine monomer is present in an excess in the first composition, the dianhydride monomer is present in an excess in the second composition, and when the dianhydride monomer is present in an excess in the first composition, the diamine monomer is present in an excess in the second composition, until the diamine monomer and the dianhydride monomer are present substantially in the same mole amounts, followed by polymerization, without being limited thereto.

It should be understood that the polymerization process is not limited to the above examples and may be performed by any method known in the art.

The dianhydride monomer applicable to preparation of the polyamic acid solution may include pyromellitic dianhydride, 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 2,2-bis(3,4-dicarboxylphenyl)propane dianhydride, 3,4,9,10-perylenetetracarboxylic dianhydride, bis(3,4-dicarboxylphenyl)propane dianhydride, 1,1-bis(2,3-dicarboxylphenyl)ethane dianhydride, 1,1-bis(3,4-dicarboxylphenyl)ethane dianhydride, bis(2,3-dicarboxylphenyl)methane dianhydride, bis(3,4-dicarboxylphenyl)ethane dianhydride, oxydiphthalic anhydride, bis(3,4-dicarboxylphenyl)sulfone dianhydride, p-phenylene bis(trimellitic monoester acid anhydride), ethylene bis(trimellitic monoester acid anhydride), bisphenol A-bis(trimellitic monoester acid anhydride), analogs or derivatives thereof or any combination thereof.

The diamine monomer applicable to preparation of the polyamic acid solution may include 4,4'-diaminodiphenylpropane, 4,4'-diaminodiphenylmethane, benzidine, 3,3'-dichlorobenzidine, 4,4'-diaminodiphenylsulfide, 3,3'-diaminodiphenylsulfone, 4,4'-diaminodiphenylsulfone, 4,4'-diaminodiphenylether (4,4'-oxydianiline), 3,3'-diaminodiphenylether (3,3'-oxydianiline), 3,4'-diaminodiphenylether (3,4'-oxydianiline), 1,5-diaminonaphthalene, 4,4'-diaminodiphenyldiethylsilane, 4,4'-diaminodiphenylsilane, 4,4'-diaminodiphenyl ethyl phosphine oxide, 4,4'-diaminodiphenyl N-methyl amine, 4,4'-diaminodiphenyl N-phenyl amine, 1,4-diaminobenzene (p-phenylene diamine), 1,3-diaminobenzene, 1,2-diaminobenzene, analogs or derivatives thereof, or any combination thereof.

It should be understood that the present invention is not limited thereto and may include any material known in the art.

The polyamic acid solution may be present in an amount of 5 wt % to 35 wt %, preferably 10 wt % to 30 wt %, in terms of solid content.

Within this range, the polyamic acid solution can have a suitable molecular weight and viscosity.

The organic solvent may be selected from any solvents capable of dissolving the polyamic acid without limitation and may include an aprotic polar solvent.

Examples of the aprotic polar solvent may include an amide solvent, such as N,N'-dimethylformamide (DMF), N,N'-dimethylacetamide (DMAc), and the like, a phenol solvent, such as p-chlorophenol, o-chlorophenol, and the like, N-methyl-pyrrolidone (NMP), γ-butyrolactone (GBL), and diglyme, without being limited thereto. These solvent may be used alone or as a mixture thereof.

In some embodiments, an additional solvent, such as toluene, tetrahydrofuran, acetone, methyl ethyl ketone, methanol, ethanol, water, and/or the like, may be used to adjust solubility of the polyamic acid.

In one embodiment, the organic solvent particularly preferably used in preparation of the precursor composition may be an amide solvent, for example, N,N-dimethylformamide and N,N-dimethyl acetamide.

On the other hand, the polyimide film according to the present invention may be obtained by preparing a polyamic acid solution through Steps (a) to (d), followed by imidization of the polyamic acid solution.

Hereinafter, the method of manufacturing a polyimide film according to the present invention will be described.

The method of manufacturing the polyimide film includes:

(a) mixing an organic solvent, a diamine monomer and a dianhydride monomer to prepare a first polyamic acid solution;

(b) mixing inorganic fillers and polyimide fillers with the first polyamic acid solution to prepare a first precursor composition;

(c) forming a gel film by casting the first precursor composition onto a support, followed by drying the first precursor composition; and (d) imidizing the first precursor composition through heat treatment of the gel film to form a polyimide film.

Further, in Step (a), all of the monomers may be added at the same time or may be sequentially added depending upon the kind of monomers and desired properties of the polyimide film. Upon sequentially adding the monomers, partial polymerization can occur between the monomers.

A process of adding the inorganic fillers or the polyimide fillers is not limited to a particular process and may be performed by any method known in the art.

The polyimide fillers may be prepared by, for example, the following process.

Specifically, the process of preparing the polyimide fillers may include the steps of: preparing a polyamic acid solution by mixing an organic solvent, a diamine monomer and a dianhydride monomer, followed by polymerization;

aging the polyamic acid solution at 60° C. to 100° C. for 2 hours to 6 hours;

solidifying the aged polyamic acid solution by adding the aged polyamic acid solution to an excess of a solvent and removing the solvent used in polymerization; and pulverizing the resulting solid to prepare polyimide fillers in powder form.

Although the process of preparing the polyimide fillers is described above, it should be understood that the present invention is not limited thereto and the polyimide fillers may be prepared by a typical method well known to those skilled in the art.

In Step (b), a first catalyst having a linear structure and a second catalyst having a ring structure may be further added to the first polyamic acid solution. Here, the second catalyst may be present in an amount of 10 mol % to 30 mol % based on the total amount of the first catalyst and the second catalyst.

According to this embodiment, the first polyamic acid solution containing the second catalyst in a particular range can achieve improvement in packing properties of polymer chains of the polyamic acid. Here, the packing properties may refer to properties wherein the polymer chains of the polyamic acid are regularly arranged and overlap each other such that the overall molecular structure of the polyamic acid can become regular.

In manufacture of the polyimide film, the polyamic acid having improved packing properties can secure improvement in packing efficiency of the polymer chains of the polyimide film, whereby the overall molecular structure of the polyimide can have regularity and includes a large amount of crystalline portions.

Accordingly, the graphite sheet manufactured using such a polyimide film has good crystallinity, which results from regular arrangement of carbon atoms in the regular molecular structure of the polyimide and can contribute to improvement in thermal conductivity of the graphite sheet, particularly thermal conductivity thereof in the plane direction.

If the content of the second catalyst is less than 10 mol %, it is difficult to achieve improvement in packing properties and crystallinity, thereby causing insufficient improvement in thermal conductivity of the graphite sheet.

If the content of the second catalyst exceeds 30 mol %, the polyimide film can suffer from significant deterioration in mechanical strength due to deterioration in imidization rate or a longer time is required for the same imidization rate, thereby deteriorating overall process efficiency.

The first catalyst and the second catalyst may be added in a total amount of 1.5 moles to 4.5 moles, specifically 2.5 moles to 3.5 moles, per 1 mole of an amic acid group in the polyamic acid.

If the total content of the first catalyst and the second catalyst exceeds or is less than the above range, the polyimide film can suffer from deterioration in thermal and/or mechanical properties.

The first catalyst having a linear structure may include at least one selected from the group consisting of dimethylacetamide (DMAc), N,N-diethylacetamide, dimethylformamide (DMF), and diethylformamide (DEF), most preferably dimethylformamide in terms of improvement in thermal conductivity.

The second catalyst having a ring structure may include at least one selected from the group consisting of N-methyl-2-pyrrolidone (NMP), N-ethylpyrrolidone (NEP), N-vinylpyrrolidone, and 1,3-dimethyl-2-imidazolidinone, most preferably N-methylpyrrolidone.

On the other hand, the step of imidizing the first precursor composition to form the polyimide film may be performed by, for example, heat imidization, chemical imidization, or combined imidization of heat imidization and chemical imidization.

Heat imidization refers to a process of promoting imidization of the polyamic acid only through heating without using a dehydration ring-closing agent and/or the like, and may be carried out by applying the polyamic acid onto a support to form a layer, followed by heat treatment for 1 hour to 8 hours while gradually raising the temperature from 40° C. to 400° C., preferably from 40° C. to 300° C., thereby forming the polyimide film through imidization of the polyamic acid.

Chemical imidization refers to a process of promoting imidization of the precursor composition through application of a dehydration agent and/or an imidization agent to the polyamic acid solution.

Combined imidization refers to a process of forming the polyimide film by adding the dehydration agent and the imidization agent to the polyamic acid solution, applying the resulting solution onto a support to form a layer, heating from 80° C. to 200° C., preferably from 100° C. to 180° C. to activate the dehydration agent and the imidization agent, and partially curing and drying the resulting product, followed by heating the resulting product at 200° C. to 400° C. for 5 seconds to 400 seconds.

According to one embodiment, the step of imidizing the first precursor composition may be carried out by chemical imidization or combined imidization. Accordingly, the dehydration agent and the imidization agent may be further added to the first polyamic acid solution, for example, in Step (b).

The dehydration agent refers to a component that promotes ring-closing reaction through dehydration of the polyamic acid and may include, for example, aliphatic acid anhydrides, aromatic acid anhydrides, N,N'-dialkylcarbodiimide, halogenated lower aliphatic acid anhydride, halogenated lower fatty acid anhydride, aryl phosphonic acid dihalide, thionyl halide, or any combination thereof.

In particular, an aliphatic acid anhydride, such as acetic anhydride, propionic anhydride, lactic anhydride, or any combination thereof may be used from the viewpoint of availability and cost.

The imidization agent refers to a component that promotes ring-closure reaction of the polyamic acid and may include, for example, an aliphatic tertiary amine, an aromatic tertiary amine, and a heterocyclic tertiary amine.

In particular, a heterocyclic tertiary amine may be used from the viewpoint of reactivity as a catalyst.

The heterocyclic tertiary amine may include, for example, quinoline, isoquinoline, β-picoline, pyridine and/or the like.

When the step of imidizing the first precursor composition is carried out through chemical imidization, the step of imidizing the first precursor composition may include applying the first precursor composition including the polyamic acid solution on the support, heat treating the first precursor composition on the support at a temperature of 40° C. to 300° C. to form a gel film, peeling off the gel film from the support, and further heating the gel film to allow imidization of remaining amic acid (hereinafter referred to as "sintering").

Next, each of the above processes will be described in detail.

For formation of the gel film, the first precursor composition is prepared by mixing the dehydration agent and/or the imidization agent in the polyamic acid solution.

The dehydration agent and the imidization agent may be selected from among the above compounds, without being limited thereto.

In the process of forming the gel film, the first precursor composition may be prepared by mixing a curing agent containing the dehydration agent and the imidization agent in the polyamic acid solution.

The dehydration agent is preferably present in an amount of 0.5 moles to 5 moles, more preferably 1.0 to 4 moles, per 1 mole of the amic acid group in the polyamic acid.

Further, the imidization agent is preferably present in an amount of 0.05 moles to 3 moles, more preferably 0.2 moles to 2 moles, per 1 mole of the amic acid group in the polyamic acid.

If the content of each of the dehydration agent and the imidization agent is less than the above range, there can be problems such as insufficient chemical imidization, film fracture during sintering, and deterioration in mechanical strength.

If the content of each of the dehydration agent and the imidization agent exceeds the above range, it is difficult to cast the first precursor composition in film form due to rapid imidization.

Next, the first precursor composition may be cast onto the support, for example, a glass plate, an aluminum foil, an endless stainless belt, a stainless drum, and/or the like.

Then, the first precursor composition on the support may be dried at a temperature of 80° C. to 200° C., preferably 100° C. to 180° C., more preferably 100° C. to 130° C.

As a result, the gel film may be formed through activation of the dehydration agent and the imidization agent and partial curing and/or drying of the first precursor composition.

Then, the gel film is peeled off of the support.

The gel film is obtained in an intermediate step of curing the polyamic acid into polyimide and has self-supportability.

In the gel film, a volatile component is preferably present in an amount of 5 wt % to 500 wt %, more preferably 5 wt % to 200 wt %, particularly preferably 5 wt % to 150 wt %.

With the gel film containing the volatile component within this range, it is possible to prevent film fracture, generation of color spots, property degradation, and the like during sintering of the polyimide film.

Further, the method of manufacturing the polyimide film according to the present invention includes the steps of imidizing the first precursor composition through heat treatment of the gel film to form the polyimide film. In one embodiment, the gel film may be subjected to heat treatment at 500° C. to 600° C.

Third Aspect: Graphite Sheet

The graphite sheet according to the present invention may be manufactured using the "polyimide film" described above or a polyimide film manufactured by the "method of manufacturing a polyimide film" described above, specifically through carbonization and/or graphitization of the polyimide film.

The graphite sheet may have a thickness of 10 μm to 100 μm, a thermal conductivity of 1,000 W/m·K or more in the plane direction thereof, and a thermal conductivity of 30 W/m·K or more in the thickness direction thereof.

In one embodiment, carbonization of the polyimide film may be performed using a hot press and/or an electric furnace under a reduced pressure or under a nitrogen gas atmosphere. According to the present invention, carbonization may be performed under a nitrogen/argon gas atmosphere by raising the temperature of the furnace from room temperature to 1,000° C. to 1,500° C. and maintaining the temperature for about 12 hours, and pressure may be applied to the polyimide film in a perpendicular direction using the hot press for high alignment of carbon atoms. Upon carbonization, a pressure of 5 kg/cm² or more, preferably 15 kg/cm² or more, more preferably 25 kg/cm² or more, may be applied to the graphite sheet. It should be understood that these conditions are provided for illustration and the present invention is not limited thereto.

Graphitization of the carbonized polyimide film may be performed subsequent to carbonization.

Graphitization may also be performed using a hot press and/or an electric furnace.

Graphitization may be performed under an inert gas atmosphere. One example of the inert gas may be a mixed gas of nitrogen, argon and a small amount of helium.

Specifically, graphitization may be performed under a nitrogen/argon atmosphere by raising the temperature of the furnace from room temperature to a temperature of 2,500° C. to 3,000° C. and maintaining the raised temperature for about 10 hours.

In some embodiments, a pressure of 100 kg/cm² or more, preferably 200 kg/cm² or more, more preferably 300 kg/cm² or more, may be applied to the graphite sheet upon graphitization. It should be understood that these conditions are provided for illustration and the present invention is not limited thereto.

BRIEF DESCRIPTION OF DRAWINGS

FIG. 1 is a picture of a surface of a polyimide film manufactured in Comparative Example 4.

FIG. 2 is a picture of a surface of a polyimide film manufactured in Example 1.

MODE FOR INVENTION

Next, the present invention will be described in more detail with reference to some examples. It should be understood that these examples are provided for illustration only and are not to be in any way construed as limiting the invention.

<Example 1>

Preparative Example 1-1: Preparation of Polyimide Fillers

With 200 g of N,N'-dimethylacetamide (DMAc) placed in a 1 L reactor, the temperature of the reactor was reduced to 0° C. and 17.23 g (84.4 mmol) of 4,4'-oxyphenylenediamine (ODA) was added to the reactor.

Then, 18.4 g (84.4 mmol) of 1,2,4,5-benzenetetracarboxylicdianhydride (PMDA) was added dropwise to the resulting solution.

The resulting mixture was stirred for 30 minutes while adjusting the reaction temperature of the mixture so as not to exceed 40° C. and the temperature of the reactor was slowly raised to 80° C., followed by stirring and aging the mixture at the raised temperature for 4 hours, thereby preparing a polyamic acid solution.

The prepared polyamic acid solution had a viscosity of 75 poise and an inherent viscosity of 1.31 dl/g.

Then, the prepared polyamic acid solution was added in 800 g of methanol to obtain a thread-like polyamic acid, and left for 10 hours.

Methanol floating on the thread-like polyamic acid was removed once every 3 hours, followed by adding 600 g of methanol to remove the solvent.

After 10 hours, all methanol was removed and the remaining solid product was pulverized using a pulverizing machine. Then, the resulting powder was washed with water and methanol, filtered, and dried in a vacuum oven at 40° C. for 10 hours, thereby preparing powder-shaped polyimide fillers having an average particle diameter of 3 μm.

Preparative Example 1-2: Preparation of First Precursor Composition

As an organic solvent, 404.8 g of dimethylformamide (DMF) was placed in a 0.5 L reactor under a nitrogen atmosphere.

With the temperature of the reactor set to 25° C., 45.59 g of ODA was added as a diamine monomer to the reactor and stirred for 30 minutes until the diamine monomer was dissolved, 49.66 g of PMDA was added as a dianhydride monomer, and a small amount of PMDA was further added until the resulting solution had a viscosity of 200,000 cP to 250,000 cP, thereby preparing a first polyamic acid.

Thereafter, as inorganic fillers, 0.26 g of dicalcium phosphate particles having an average particle diameter of 3 μm were added to the polyamic acid together with 0.86 g of the polyimide fillers prepared in Preparative Example 1-1, and stirred for 1 hour while maintaining the temperature of the reactor, thereby preparing a first precursor composition.

In conversion for comparison, the inorganic fillers were present in an amount of 0.3 parts by weight and the polyimide fillers were present in an amount of 1 part by weight relative to 100 parts by weight of the first polyamic acid in the first precursor composition in terms of solid content.

Preparative Example 1-3: Preparation of Polyimide Film 2.25 g of beta-picoline (BP) as an imidization agent, 16.73 g of acetic anhydride (AA) as a dehydration agent, 9.5 g of DMF as a first catalyst, and 3.2 g of NMP as a second catalyst were added to 70 g of the first precursor composition prepared in Preparative Example 1-2, and were evenly stirred therewith. Then, the resulting composition was cast to a thickness of 350 μm on an SUS plate (100SA, Sandvik) using a doctor blade and dried in a temperature range of 100° C. to 200° C.

Thereafter, the dried film was peeled off of the SUS plate and secured to a pin frame for transfer to a hot tenter.

In the hot tenter, the film was heated from 200° C. to 600° C., cooled to 25° C., and separated from the pin frame, thereby providing a polyimide film having a size of 20 cm×20 cm×50 μm (length×width×thickness).

<Example 2>

A polyimide film was manufactured in the same manner as in Example 1 except that polyimide fillers having an average particle diameter of 1 μm were prepared in Preparative Example 1-1.

<Example 3>

A polyimide film was manufactured in the same manner as in Example 1 except that polyimide fillers having an average particle diameter of 10 μm were prepared in Preparative Example 1-1.

<Example 4>

A polyimide film was manufactured in the same manner as in Example 1 except that the amount of the polyimide fillers was changed to 0.1 parts by weight.

<Example 5>

A polyimide film was manufactured in the same manner as in Example 1 except that the amount of the polyimide fillers was changed to 5 parts by weight.

<Example 6>

A polyimide film was manufactured in the same manner as in Example 1 except that the amount of the inorganic fillers was changed to 0.5 parts by weight.

<Example 7>

A polyimide film was manufactured in the same manner as in Example 1 except that barium sulfate particles having an average particle diameter of 3 μm were added in an amount of 0.3 parts by weight as the inorganic fillers.

<Comparative Example 1>

A polyimide film was manufactured in the same manner as in Example 1 except that the polyimide fillers were not used.

<Comparative Example 2>

A polyimide film was manufactured in the same manner as in Example 1 except that the inorganic fillers were not used.

<Comparative Example 3>

A polyimide film was manufactured in the same manner as in Example 1 except that the polyimide fillers and the inorganic fillers were not used.

<Comparative Example 4>

A polyimide film was manufactured in the same manner as in Example 1 except that polyimide fillers having an average particle diameter of 15 μm was prepared in Preparative Example 1-1.

<Comparative Example 5>

A polyimide film was manufactured in the same manner as in Example 1 except that the amount of the polyimide fillers was changed to 10 parts by weight.

<Comparative Example 6>

A polyimide film was manufactured in the same manner as in Example 1 except that the amount of the polyimide fillers was changed to 0.05 parts by weight.

<Comparative Example 7>

A polyimide film was manufactured in the same manner as in Example 1 except that the amount of the inorganic fillers was changed to 0.1 parts by weight.

<Comparative Example 8>

A polyimide film was manufactured in the same manner as in Example 1 except that the amount of the inorganic fillers was changed to 0.6 parts by weight.

<Comparative Example 9>

A polyimide film was manufactured in the same manner as in Example 1 except that dicalcium phosphate particles having an average particle diameter of 5 μm were used.

<Comparative Example 10>

A polyimide film was manufactured in the same manner as in Example 1 except that dicalcium phosphate particles having an average particle diameter of 1 μm were used.

<Comparative Example 11>

A polyimide film was manufactured in the same manner as in Example 1 except that the second catalyst was not used and 11.84 g of DMF was used as the first catalyst in Preparative Example 1-3.

<Experimental Example 1>

For each of the polyimide films of Examples and Comparative Examples, external appearance was observed depending upon the average particle diameter and the input amount of the polyimide fillers and/or the inorganic fillers.

In the experiment, the polyimide films manufactured in Examples 1 to 7, which satisfied conditions for the average particle diameters and the input amounts according to the present invention, were compared with the polyimide films manufactured in Comparative Examples 4, 5, 8 and 9, which failed to satisfy the conditions for the average particle diameters and the input amounts according to the present invention. The number of surface defects such as protrusions or pin holes of each of the polyimide films was counted with the naked eye and evaluation results are shown Table 1, FIG. 1 (Comparative Example 4) and FIG. 2 (Example 1).

TABLE 1

| | PI fillers | | Inorganic fillers | | | |
| --- | --- | --- | --- | --- | --- | --- |
| | | | | Dicalcium phosphate | Barium sulfate | |
| Kind | Size (μm) | Content parts (by weight) | Size (μm) | (parts by weight) | (parts by weight) | Surface defect (Number) |
| Example 1 | 3 | 1 | 3 | 0.3 | — | 0 |
| Example 2 | 1 | 1 | 3 | 0.3 | — | 0 |
| Example 3 | 10 | 1 | 3 | 0.3 | — | 0 |
| Example 4 | 3 | 0.1 | 3 | 0.3 | — | 0 |
| Example 5 | 3 | 5 | 3 | 0.3 | — | 0 |
| Example 6 | 3 | 1 | 3 | 0.5 | — | 0 |
| Example 7 | 3 | 1 | 3 | — | 0.3 | 0 |
| Comparative Example 4 | 15 | 1 | 3 | 0.3 | — | 35 |
| Comparative Example 5 | 3 | 10 | 3 | 0.3 | — | 21 |
| Comparative Example 8 | 3 | 1 | 3 | 0.6 | — | 6 |
| Comparative Example 9 | 3 | 1 | 5 | 0.3 | — | 8 |

It could be seen that numerous surface defects were generated on each of the polyimide films of Comparative Examples 4, 5, 8 and 9 prepared using the polyimide fillers and/or the inorganic fillers, the average particle diameters and the input amounts of which did not fall within the numerical ranges according to the present invention. Further, referring to FIG. 1 showing a picture of a surface of the polyimide film of Comparative Example 4, it could be seen that the polyimide film of Comparative Example 4 had poor surface quality, as observed with the naked eye. Accordingly, it could be seen that use of an excess of the polyimide fillers and/or the inorganic fillers or the use of the polyimide fillers and/or the inorganic fillers having too large particle size provided polyimide films having unsmooth surfaces.

Conversely, it could be seen that the polyimide films of Examples manufactured using the polyimide fillers and/or the inorganic fillers, the average particle diameters and the input amounts of which were within the numerical ranges according to the present invention, did not suffer from surface defects. Further, referring to FIG. 2 showing a picture of a surface of the polyimide film of Example 1, it could be seen that the polyimide film of Example 1 had good surface quality, as observed with the naked eye.

<Experimental Example 2>

Each of the polyimide films of Examples and Comparative Examples was heated to 1,200° C. at a heating rate of 3° C./min in a high temperature furnace under a nitrogen atmosphere and was left at the same temperature for about 2 hours (carbonization). Then, the polyimide film was heated to 2,800° C. at a heating rate of 5° C./min in an ultra-high temperature furnace under an argon atmosphere and was left for 1 hour (graphitization), followed by cooling, thereby preparing a graphite sheet having a thickness of 30 μm.

For each of the manufactured graphite sheets, thermal conductivity in the plane direction and in the thickness direction and the number of bright spots were measured and results are shown in Table 2.

For each of the graphite sheets, heat diffusion rates in the thickness direction and in the plane direction thereof were measured by a laser flash method using a diffusion rate measurement instrument (Model: LFA 467, Netsch), and thermal conductivity was calculated by multiplying the measured heat diffusion rate by density (weight/volume) and specific heat (specific heat value measured by DSC).

The number of bright spots is a factor that causes surface defects of the graphite sheets and the number of protrusions having a size of 0.05 mm or more in a square of 50 mm×50 mm of the graphite sheet was counted.

From Table 2, the following results could be obtained.

First, all of the polyimide films of Examples were manufactured using a suitable amount of the polyimide fillers having an average particle diameter according to the present invention. Each of the graphite sheets manufactured using such polyimide films had very good thermal conductivity, that is, a thermal conductivity of 1,000 W/m·K or more in the plane direction and a thermal conductivity of 30 W/m·K or more in the thickness direction, as shown in Table 2.

It is estimated that this result was obtained due to graphitization of at least some polyimide particles between the layers of the multilayer graphite structure to form a linking portion acting as a heat transfer path between the layers thereof.

Conversely, it could be seen that the graphite sheet of Comparative Example 1 prepared using the polyimide film free from the polyimide fillers had much lower thermal conductivity in the thickness direction than the graphite sheets of Examples.

It is understood that, since the graphite sheet of Comparative Example 1 has a gap between the layers of the multilayer graphite structure instead of the linking portion as described above, the graphite sheet suffers from inefficient heat transfer between the layers.

That is, there can be a significant difference in thermal conductivity of the graphite sheet in the thickness direction thereof depending upon the presence of the polyimide particles.

Further, the graphite sheets of Examples had 5 or fewer bright spots, indicating better surface quality than the graphite sheets of Comparative Examples 4, 8 and 9.

Secondly, although an excess of the polyimide fillers can be taken into account in order to form more linking portions, Comparative Example 5 shows that the graphite sheet including an excess of the polyimide fillers has much lower thermal conductivity in the plane direction than the graphite sheets of Examples.

Upon carbonization and graphitization, most components of the fillers in the polyimide film are sublimated and a higher amount of sublimation gas provides a higher possibility of fracture of the graphite structure. Consequently, in Comparative Example 5, it is estimated that a large amount of gas derived from an excess of the polyimide fillers

TABLE 2

| Kind | Thermal conductivity in plane direction (W/m · K) | Thermal conductivity in thickness direction (W/m · K) | Number of bright spots (EA) |
| --- | --- | --- | --- |
| Example 1 | 1127.3 | 33.2 | 2 |
| Example 2 | 1188.4 | 30.1 | 1 |
| Example 3 | 1058.9 | 34.0 | 5 |
| Example 4 | 1174.6 | 31.5 | 0 |
| Example 5 | 1043.5 | 34.9 | 3 |
| Example 6 | 1135.0 | 30.2 | 2 |
| Example 7 | 1048.1 | 30.5 | 4 |
| Comparative Example 1 | 1142.2 | 5.4 | 3 |
| Comparative Example 2 | — | — | Graphitization did not proceeded |
| Comparative Example 3 | — | — | Graphitization did not proceeded |
| Comparative Example 4 | 894.5 | 43.2 | 27 |
| Comparative Example 5 | 832.2 | 51.3 | 12 |
| Comparative Example 6 | 1139.4 | 4.9 | 3 |
| Comparative Example 7 | 986.0 | 23.6 | 2 |
| Comparative Example 8 | 1104.5 | 27.1 | 21 |
| Comparative Example 9 | 951.5 | 23.5 | 13 |
| Comparative Example 10 | 880.6 | 19.8 | 1 |
| Comparative Example 11 | 997.1 | 17.5 | 2 | partially damaged the multilayer graphite structure while obstructing rearrangement of carbon atoms in the course of carbonization and graphitization, thereby causing deterioration in thermal conductivity of the graphite sheet in the plane direction thereof.

On the other hand, use of the polyimide fillers having a larger particle size can be taken into account in order to form more linking portions and this will be described with reference to Comparative Example 4.

In Comparative Example 4, it could be seen that, although the polyimide film was manufactured using a suitable amount of polyimide fillers having an average particle diameter of 15 μm, the polyimide film did not exhibit desired thermal conductivity in the plane direction thereof, and it is estimated that rearrangement of carbon atoms in the course of carbonization and graphitization was obstructed, thereby failing to provide a desired result.

Further, it could be seen that the polyimide film of Comparative Example 6 including a relatively small amount of the polyimide fillers had significantly low thermal conductivity in the thickness direction thereof. It is understood that this result was caused by insufficient formation of the linking portion.

From the above results, it can be seen that the content and the particle size of the polyimide fillers are critical factors in realization of a graphite sheet having good thermal conductivity.

Thirdly, it could be seen that a graphite sheet could not be obtained using the polyimide films of Comparative Examples 2 and 3, which were prepared without using the inorganic fillers and did not allow graphitization, and that the graphite sheets of Comparative Example 7 and 10 suffered from deterioration in thermal conductivity both in the plane direction and in the thickness direction, in which the polyimide film of Comparative Example 7 was prepared using a small amount of the inorganic fillers and the polyimide film of Comparative Example 10 was prepared using large inorganic fillers.

From these results, it could be seen that the inorganic fillers acted as a critical factor in conversion from polyimide into graphite and allowed significant improvement in thermal conductivity particularly when the amount and the particle size of the inorganic fillers fall within certain ranges.

Fourthly, in Comparative Example 11, the polyimide film was manufactured using the first catalyst alone and it could be seen that the graphite sheet manufactured using the polyimide film of Comparative Example 11 had relatively low thermal conductivity in the plane direction and in the thickness direction, as shown in Table 2.

It is estimated that this result was caused by relatively low packing efficiency of polyimide chains upon imidization of the polyamic acid.

Contrary to Comparative Example 11, the graphite sheets manufactured using the polyimide films of Examples using the second catalyst together with the first catalyst exhibited much better thermal conductivity in the plane direction than the graphite sheet manufactured using the polyimide film of Comparative Example 11. From this result, it can be anticipated that use of a suitable amount of the second catalyst can induce improvement in packing efficiency of the polyimide chains and such improvement in packing efficiency advantageously will allow regular arrangement of carbon atoms upon carbonization and graphitization.

It should be understood that various modifications, changes, alterations, and equivalent embodiments can be made by those skilled in the art without departing from the spirit and scope of the present invention.

INDUSTRIAL APPLICABILITY

Various advantages of the present invention obtained by including the sublimable inorganic fillers and the polyimide fillers have been described above in detail.

In summary, in the polyimide film according to the present invention, the polyimide fillers may form at least one linking portion between the layers of the multilayer graphite structure to provide a heat transfer path upon carbonization and graphitization. With this structure, the polyimide film can realize a graphite sheet achieving significant improvement in thermal conductivity not only in the plane direction thereof but also in the thickness direction thereof.

The polyimide film according to the present invention includes a suitable amount of inorganic fillers to induce foaming phenomenon of the polyimide film, thereby realizing a graphite sheet having good flexibility.

Advantages obtained by use of two or more types of catalysts are described in detail in the above description. In summary, a combination of two or more types of catalysts having different properties can improve packing efficiency of polymer chains in a polyamic acid and a polyimide film derived from such a polyamic acid has a regular arrangement of the polymer chains. Such a polyimide film can realize a graphite sheet having improved thermal conductivity.

The invention claimed is:

1. A method of manufacturing polyimide film for graphite sheets, comprising:
   (a) mixing an organic solvent, a diamine monomer and a dianhydride monomer to prepare a first polyamic acid solution;
   (b) mixing inorganic fillers and polyimide fillers along with a first catalyst having a linear structure and a second catalyst having a ring structure with the first polyamic acid solution to prepare a first precursor composition;
   (c) forming a gel film by casting the first precursor composition onto a support, followed by drying the first precursor composition; and
   (d) imidizing the first precursor composition through heat treatment of the gel film to form a polyimide film,
   the polyimide film including sublimable inorganic fillers and spherical polyimide fillers,
   wherein the inorganic fillers are present in an amount of 0.2 parts by weight to 0.5 arts by weight relative to 100 parts by weight of the first polyamic acid and the polyimide fillers are present in an amount of 0.1 parts by weight to 5 parts by weight relative to 100 parts by weight of the first polyamic acid,
   wherein the inorganic fillers have an average particle diameter of 1.5 μm to 4.5 μm.

2. The method according to claim 1, wherein the first catalyst comprises at least one selected from the group consisting of dimethylacetamide (DMAc), N,N-diethylacetamide, dimethylformamide (DMF), and diethylformamide (DEF).

3. The method according to claim 1, wherein the first catalyst is dimethylformamide.

4. The method according to claim 1, wherein the second catalyst is N-methyl-2-pyrrolidone (NMP).

5. The method according to claim 1, wherein the first catalyst and the second catalyst are added in a total amount of 1.5 moles to 4.5 moles per 1 mole of an amic acid group in a polyamic acid.

6. The method according to claim 1, wherein the second catalyst is present in an amount of 10 mol % to 30 mol % based on the total amount of the first catalyst and the second catalyst.

7. The method according to claim 1, wherein, in Step (b), a dehydration agent and an imidization agent are further added to the first polyamic acid solution.

* * * * *